United States Patent [19]

Gullicksen et al.

[11] 4,260,218
[45] Apr. 7, 1981

[54] STABILIZED OPTICAL SYSTEM WITH OFF-AXIS STABILIZER

[75] Inventors: Spencer O. Gullicksen; Thomas A. Roberts, both of San Jose, Calif.

[73] Assignee: Tracor, Inc., Austin, Tex.

[21] Appl. No.: 959,223

[22] Filed: Nov. 9, 1978

Related U.S. Application Data

[63] Continuation-in-part of Ser. No. 814,240, Jul. 8, 1977, abandoned.

[51] Int. Cl.³ .............................................. G02B 23/00
[52] U.S. Cl. ...................................... 350/16; 356/248
[58] Field of Search ................. 350/16; 356/143, 148, 356/248; 33/230, 236, 256

[56] References Cited

U.S. PATENT DOCUMENTS

| | | | |
|---|---|---|---|
| 3,514,179 | 5/1970 | Koeber, Jr. ..................... | 356/149 X |
| 3,564,931 | 2/1971 | Humphrey ........................... | 74/5.5 |
| 3,608,995 | 9/1971 | Humphrey ........................... | 356/149 X |
| 4,013,339 | 3/1977 | Ando et al. ............................. | 350/16 |

FOREIGN PATENT DOCUMENTS 393782 10/1944 France ..................................... 350/16

OTHER PUBLICATIONS

Fraser, "Design of a Low Cost, High Magnification, Passively Stabilized Monocular, The Stedi-Eye", *SPIE Proceedings*, vol. 39, Aug. 1973.

*Primary Examiner*—John K. Corbin
*Assistant Examiner*—Matthew W. Koren
*Attorney, Agent, or Firm*—Frank S. Vaden, III

[57] ABSTRACT

Disclosed is a stabilized optical system, including a housing, an objective lens group mounted to the housing for collecting light from the image to be viewed, and an eyepiece lens group adjustably mounted to the housing for focusing the image at the eye of a viewer. Pivotally mounted between the objective and eyepiece lens groups is a roof Pechan prism. The prism is connected through a rigid gimbaled linkage to a gyroscopic stabilizer which is offset from the optical axis, so that rotational motion of the housing is not transmitted to the prism, thereby stabilizing the image viewed through the optical system. The gyroscopic stabilizer is provided with a damper for minimizing nutational motion of the stabilizer and a precision compensator for counteracting the precession of the gyroscope. The eyepiece lens group includes a negative lens component positioned between the objective lens group and the remaining components of the eyepiece lens group.

4 Claims, 6 Drawing Figures

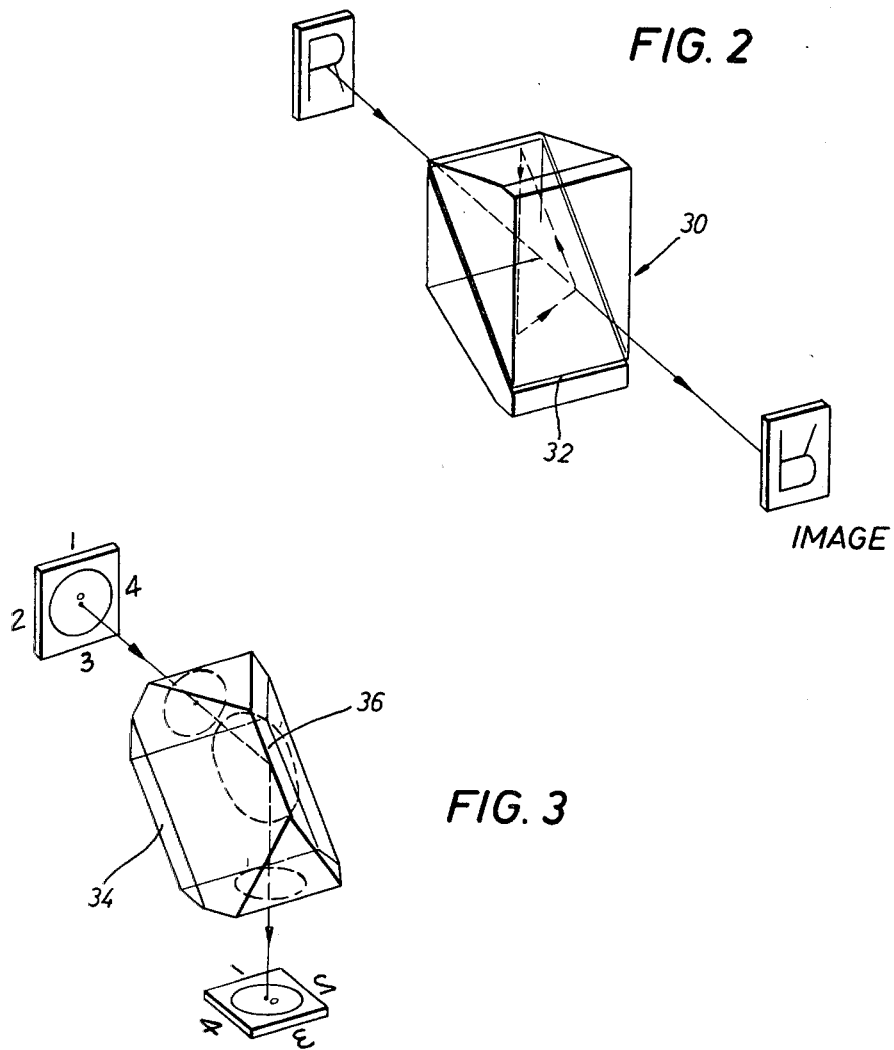
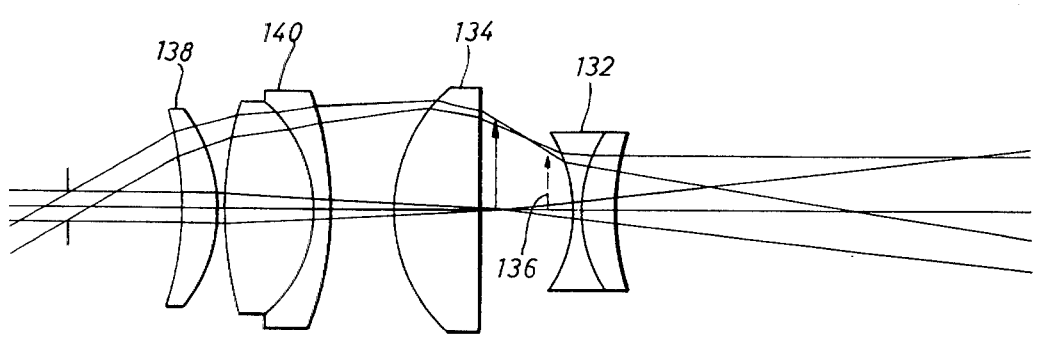

STABILIZED OPTICAL SYSTEM WITH OFF-AXIS STABILIZER

CROSS-REFERENCE TO RELATED APPLICATION

This application is a continuation-in-part of application Ser. No. 814,240, filed July 8, 1977 now abandoned.

BACKGROUND OF THE INVENTION

This invention pertains to stabilized optical systems and more particularly to such systems employing an offaxis stabilizer.

An optical system which provides magnification, such as binoculars or a telescope, will tend to exaggerate in the image produced any physical disturbance which is imparted to the system itself during viewing. As a consequence, higher powered optical systems (e.g., beyond 7× magnification) are frequently not practical without some means of stabilization to cancel such effects, since vibration, muscular movements of the operator, etc. will distort the images viewed to such an extent that they are not perceptible. Consequently, it is necessary to compensate for these vibrations in high power optical systems, especially where such systems are to be used in areas of high vibration or frequent motion, such as aboard a ship or an aircraft.

One technique which may be utilized to achieve a stabilized image is to isolate the entire optical system from the perturbing motion. This has been done in the prior art, but such a solution tends to be expensive and to require a large and bulky apparatus. Therefore, others have attempted to solve the stabilization problem by isolating some component within the optical train of the system. When one optical component is isolated from the disrupting motion, the consequent motion of that component relative to the remainder of the system will tend to compensate for the disturbance imparted to the viewed image by the remaining parts of the optical system.

This method of component isolation may be illustrated by reference to a typical optical system of interest, such as that of a binocular or monocular. Such optical systems normally include an objective lens group, an eyepiece lens group, and an intermediate optical element. The intermediate element, which is frequently made up of one or more prisms, is added to the system to correct for the inversion and reversion of the image which is caused by the optical action of the objective and eyepiece lens groups.

In binoculars and monoculars, the eyepiece lens group is not considered a practical candidate for stabilization isolation because it should be held stationary and close to the eye of the viewer. Furthermore, although the stabilization of the objective lens group in such systems has been attempted, it has been generally recognized by those skilled in the art that the most desirable solution to the stabilization problem is to isolate the intermediate element, i.e., the inverting and reverting prism or prisms. Stabilized systems of this type are known, typical examples being described and illustrated in U.S. Pat. No. 4,013,339, issued Mar. 22, 1977 to Ando et al., entitled "Optical Image Stabilizing System"; and in an article by David B. Fraser entitled "Design of a Low Cost, High Magnification, Passively Stabilized Monocular, the Stedi-Eye", appearing in Vol. 39 of the SPIE Proceedings, August, 1973. The teachings of each of the above publications are hereby incorporated by reference into this application.

Various techniques for stabilizing the intermediate optical element in binocular and monocular systems have been proposed, including gyrostabilized central afocal devices, programmed stabilization employing hydrostatic techniques, tuned and dampened isolators using springs and bearings, and axially oriented inertial stabilization systems, as shown in U.S. Pat. No. 4,013,339, mentioned above. All of the various techniques which are known in the art, however, suffer from disadvantages. Some of these devices, for example, utilize inertial elements which are aligned with the optical train. These devices, as a result, require specially fabricated optical elements, such as lenses which may be rotated, etc. As a consequence, such devices tend to be inordinately expensive to manufacture and, furthermore, tend to extend the overall length of the optical train, which may be undersirable in some applications, as when the device is to be hand held and portable. Other stabilizing devices known in the art utilize an off-axis stabilizing element such as a gyroscope, connected through some form of linkage to an optical element. Previous off-axis stabilizer designs, however, have incorporated resilient members into the linkage between the inertial element and the stabilized optical element in order to compensate for the nutational and precessional motions of the gyroscope. Because of the compliance introduced by such resilient members, a highly accurate alignment of the optical element may not always be achieved in such designs and a deteriorated image may result.

Therefore, a need has developed in the art for an improved stabilized optical system incorporating an off-axis stabilizer.

Furthermore, it would be advantageous to provide such a system with a rigid connecting linkage between the stabilized optical element and the off-axis stabilizer to consistently maintain the accurate alignment of the optical element.

In addition, it would be advantageous to provide such a system with nutational damping and precessional compensation which would not degrade the stabilized image produced by the optical system.

It would also be advantageous to provide such a system in a compact and lightweight package that is highly portable.

In addition, it would be advantageous to provide such a system with a shortened optical train to enhance the convenience and portability of the system.

SUMMARY OF THE INVENTION

It is a general object of this invention to provide a new and improved stabilized optical system.

The stabilized optical system of this invention comprises a housing, an objective lens group mounted to the housing for collecting light from an image to be viewed, an eyepiece lens groups adjustably mounted to the housing for focusing the image at the eye of a viewer, a stabilized optical element pivotally mounted to the housing between the objective and the eyepiece lens groups, a gyroscopic stabilizer positioned off the optical axis of the lens groups; and a rigid linkage connecting the stabilized element and the stabilizer to isolate the stabilized element from rotational motion of the housing in azimuth or elevation.

In the preferred embodiment, the stabilized optical element is a roof Pechan prism, which is pivoted in elevation and azimuth about axes passing through the midpoint between the nodal points of the eyepiece and objective lens groups, this unique location of the pivotal point affording viewed image stabilization for the system.

In the preferred embodiment, the rigid linkage connecting the stabilized prism and the gyroscopic stabilizer includes an elevation gimbal pivotally attached to the housing about a horizontal axis passing through the midpoint between the nodal points of the eyepiece and objective lens groups, a prism azimuth gimbal pivotally connecting the elevation gimbal to the prism about a first vertical axis passing through the midpoint, a stabilizer azimuth gimbal pivotally connecting the elevation gimbal to the gyroscopic stabilizer about a second vertical axis, and a link, for aligning the prism with the gyroscopic stabilizer, which is pivotally connected to the prism about a third vertical axis and is pivotally connected to the stabilizer about a fourth vertical axis. The vertical axes are arranged to define a parallelogram, and in the preferred embodiment, the axes define a rectangle.

The stabilization system may further include a nutation damper resiliently connected to the elevational gimbal about the horizontal axis for providing nutational damping. In the preferred embodiment, the resilient connection comprises an energy absorbing vinyl polymer having a high damping coefficient.

The system may also include a precession compensator for countering the effects of gyroscope precession. In the preferred embodiment, the compensator includes a magnet mounted to the housing and aligned with the spin axis of the gyroscopic stabilizer and a rotating nonmagnetic member which is affixed to the gyroscopic stabilizer and is aligned with the spin axis. The nonmagnetic member is adapted to cut the magnetic field of the magnet when the gyroscopic stabilizer pivots in azimuth or elevation, thereby creating an eddy current-induced drag force to realign the gyroscopic stabilizer.

In the preferred embodiment, the system also includes a pin affixed to the gyroscopic stabilizer and a conical guide slidably affixed to the housing and adapted to engage the pin. In this manner the gyroscopic stabilizer and the optical element may be mechanically aligned with the optical axis prior to sighting with the system.

Examples of the more important features of this invention have thus been broadly outlined in order that the detailed description which follows may be better understood, and so that the contributions which this invention provides to the art may be better appreciated. There are, of course, additional features of the invention which will be described herein and which will be included within the subject matter of the claims appended hereto.

BRIEF DESCRIPTION OF THE DRAWINGS

Additional objects, features, and advantages of the present invention will become apparent by referring to the following detailed description of the preferred embodiments in connection with the accompanying drawings, wherein like reference numerals refer to like elements throughout all the figures. In the drawings:

FIG. 2 is an oblique view of an optical element illustrating the inverting action of a Pechan prism.

FIG. 3 is an oblique view of an optical element illustrating the reverting action of a roof vertex on a prism.

FIG. 6 is an optical schematic showing a ray tracing for the optical components of the eyepiece lens group for the optical system shown in FIG. 1.

DESCRIPTION OF THE PREFERRED EMBODIMENT

Figure 1:
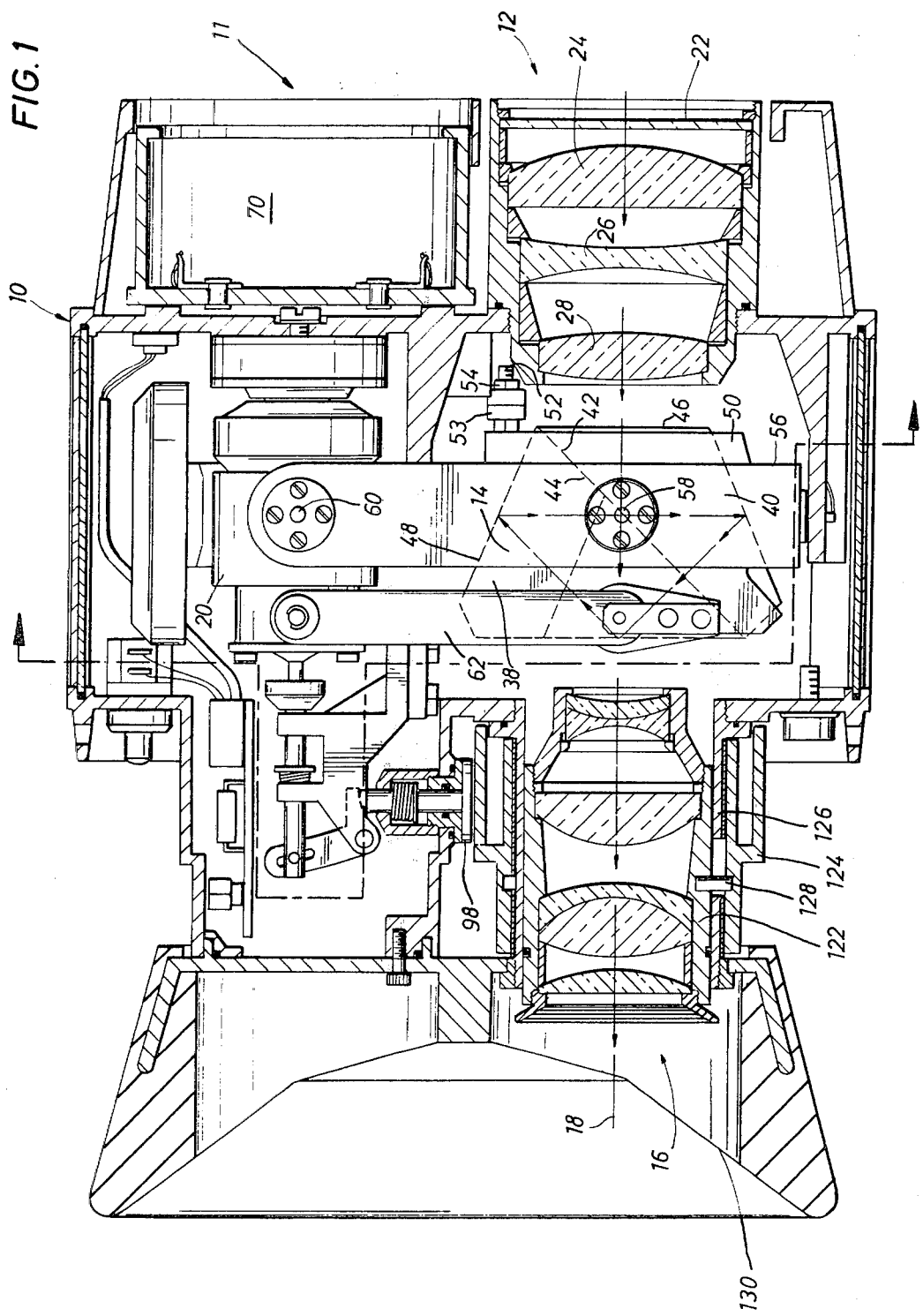
FIG. 1 is a plan view in cross section illustrating an optical system constructed in accordance with the present invention.

Now referring to the drawings, and first to FIG. 1, a plan view of the preferred embodiment of present invention is illustrated in cross section. In this embodiment, the optical system is incorporated into a compactly sized monocular 11, which is designed for hand held viewing.

A monocular housing 10 contains an objective lens group 12, a stabilized prism 14, and an eyepiece lens group 16, all of which are aligned on the optical axis 18. The prism 14 is stabilized by means of a gyroscopic stabilizer 20.

The objective lens group 12 performs the function of collecting light from the object to be viewed. In the specific embodiment illustrated, the lens group 12 includes a front cover glass or filter 22 and three lenses, a first positive lens 24, a negative lens 26, and a second positive lens 28. Together the three lenses constitute a triplet with high off-axis performance and an appropriate focal length for the optical system. The particular lens arrangement, focal length, and performance may be arranged, as will be understood by those skilled in the art, to suit the particular characteristics desired for a given application. In the embodiment illustrated, a high off-axis performance is required to provide for an instantaneous field of view of 6.5 degrees. A still larger field of view, however, is necessary in order to accommodate an angular perturbation cone of, for example, plus or minus 6.5 degrees, because of the freedom of angular movement of the stabilized prism 14, as will be further explained herein. Consequently, the objective lens group 12 is designed in the preferred embodiment to cover a total field of view of greater than 19 degrees.

The next element along the optical axis 18 is the stabilized prism 14. In the system of the invention, the prism 14 performs the two primary functions of stabilization and image reversion and inversion. Because of the manner in which the objective lens group 12 and the eyepiece lens group 16 operate on an image viewed by the system, the image resulting from viewing through those two optical elements will appear to the viewer to be inverted (i.e., upside down) and reverted (i.e., a mirror image). In order to have the image appear with the proper orientation to an observer using the device, the prism 14 is inserted in the optical path to perform an additional inversion and reversion of the image.

The manner in which a prism may be utilized to accomplish the necessary reversion and inversion may be seen from FIGS. 2 and 3. In FIG. 2, a Pechan prism 30 is illustrated. Such a prism is constructed of two portions, with a small air gap 32 between the parallel inner faces of the two segments. Light entering the prism 30 is reflected a total of five times, causing the transmitting image to be inverted, as shown in FIG. 2. As shown in FIG. 3, a prism can also be made to revert the image if it is provided with a roof. In FIG. 3, a roof prism 34 is provided with a roof 36. By tracing the ray path shown in the figures, one may see that the effect of the roof 36 is to revert the transmitted image. Thus by equipping a Pechan prism with a roof, the prism may be made to both revert and invert an incoming image.

The stabilized prism 14 in the preferred embodiment of the present invention is a roof Pechan prism and thus accomplishes the necessary inversion and reversion of the image viewed. Referring again to FIG. 1, the prism 14 is a roof Pechan prism made from two prism halves 38 and 40, which include diagonal facing surfaces 42 and 44 arranged at 45 degrees with respect to the entrance face 46. The roof of the prism 14 is located on the prism half 38, with the roof apex 48. In this design, the incoming light is reflected six times in the prism 14, as illustrated by the dashed lines, thereby inverting and reverting the image to correct for the initial image inversion and reversion caused by the lens groups 12 and 16. This inverting and reverting action of the prism is commonly known as image erection. The roof Pechan prism 14 in this design may thus conventionally be denoted as an erecting prism having a strong shortening effect on the optical train due to its folded configuration.

In the system illustrated, the prism 14 is located in front of the image plane for the objective lens group 12, and thus operates in coverging light. The glass path of the image forming rays, which is over 143 mm long in the embodiment illustrated, refracts the light rays without altering the convergence angle. The effect of the inclusion of this much glass in the rear focal length of the objective lens group 12 is to move the image plane further away from the lens. This apparent lengthening of the device is, however, greatly offset by the folded geometry of the Pechan prism since its actual length along the optical axis 18 is only approximately 36 mm in this example. Since there is no change in the convergence angle due to prism 14, it exhibits a unity magnification. The introduction of the prism also requires that the eyepiece lens group 16 be capable of correcting the chromatic dispersion to tolerable levels.

Figure 5:
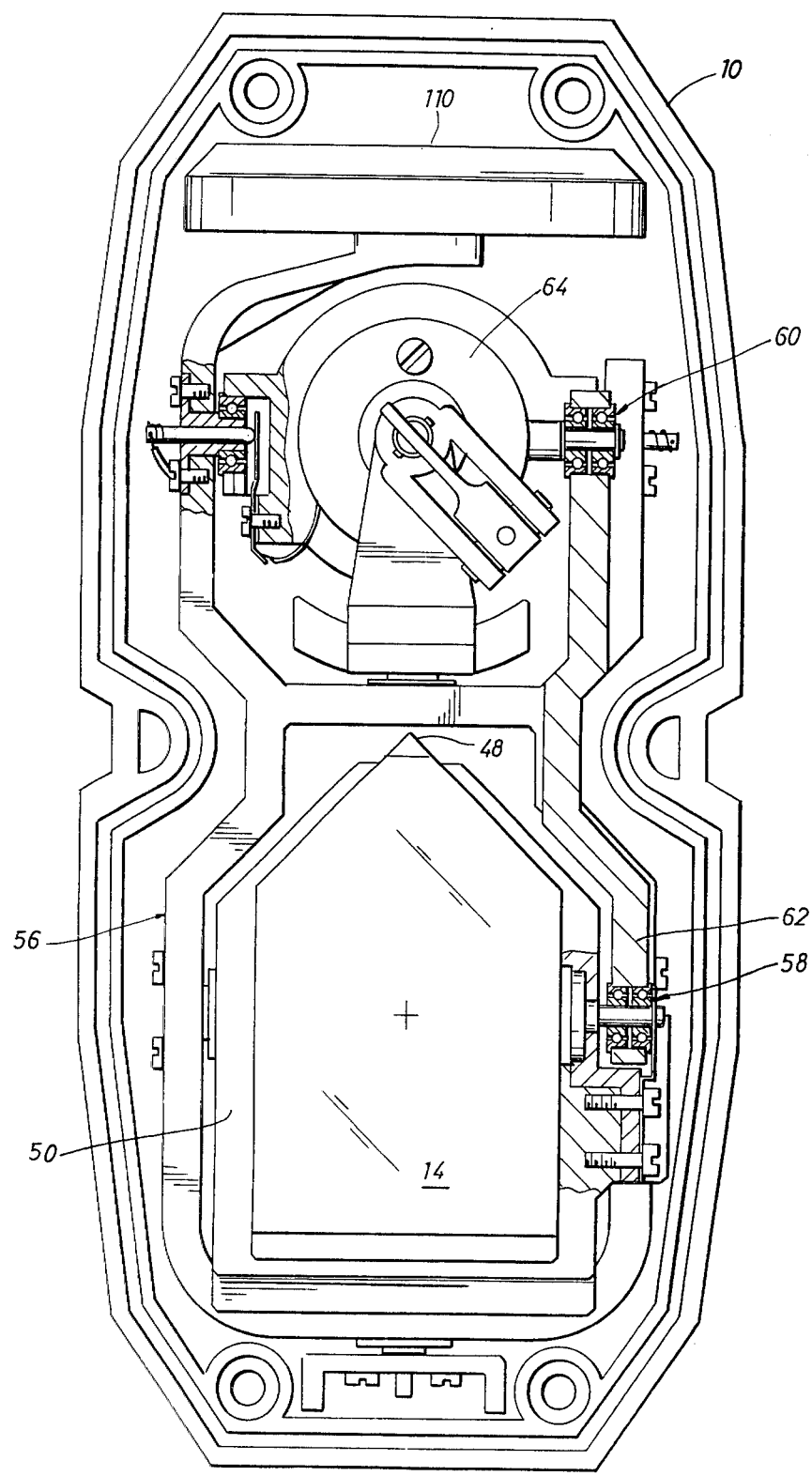
FIG. 5 is an end view in cross section showing the optical system of FIG. 1 along the lines 5—5 of FIG. 1

As may be seen in FIGS. 1 and 5, the prism 14 also performs an important function in operating as the stabilizing element in the optical system of this invention. The prism performs this function through its rigidly linked connection with the gyroscopic stabilizer 20. As a part of this connection, the prism 14 is mounted in a prism support 50. A threaded stud 52 is provided with a nut 54 and weight 53 thereon in order to permit the balancing of the prism 14 and the support 50 about the pivot points. The prism support 50 in turn is pivotally connected to the elevation gimbal 56 through prism azimuth gimbal 58. The azimuth gimbal 58 is arranged to pivot the prism 14 about a nominally vertical axis which passes through the midpoint between the nodal points of the objective lens group 12 and the eyepiece lens group 16.

The gyroscopic stabilizer 20 is similarly pivotally connected to the elevation gimbal 56 by a stabilizer azimuth gimbal 60. The stabilizer azimuth gimbal permits the stabilizer 20 to pivot about a nominally vertical axis parallel to the aforementioned pivotal axis for the prism 14. The elevation gimbal 56 is in turn pivotally connected to the housing 10 about a horizontal axis which again passes through the midpoint between the nodal point of the objective lens group 12 and the nodal point of the eyepiece lens group 16. Through the latter connection, and the connections of the prism and stabilizer azimuth gimbals 58 and 60, the prism 14 and the stabilizer 20 are rigidly linked so that they correspond exactly in spatial orientation with respect to the elevation plane. In addition, a link 62 is pivotally connected to the prism support 50 about a nominally vertical axis, and pivotally connected to the stabilizer 20 about a second nominally vertical axis. The combination of the link 62 with the azimuth gimbals 58 and 60 thus ensures that the prism 14 will also correspond in its azimuth orientation to the azimuth orientation of the stabilizer 20. In the embodiment illustrated, the nominal amount of movement of prism 14 which is permitted by the gimbal arrangement is plus or minus 6.5 degrees off the optical axis in either azimuth or elevation. The maximum prism excursion must be chosen in light of the overall optical performance required of the system. An angular excursion beyond approximately 3 degrees off axis in the preferred embodiment, for example, will introduce astigmatism in the viewed image. The effect of this aberration would be to reduce the viewed resolution by approximately 50 percent. The introduction of astigmatism is due to the effect of tilting a thick plate in the image forming cone of the objective lens. The excursion of the prism 14 will occur, however, only when the viewing device is panned at an excessive rate which, in and of itself, would cause image blur exceeding the loss in resolution.

Figure 4:
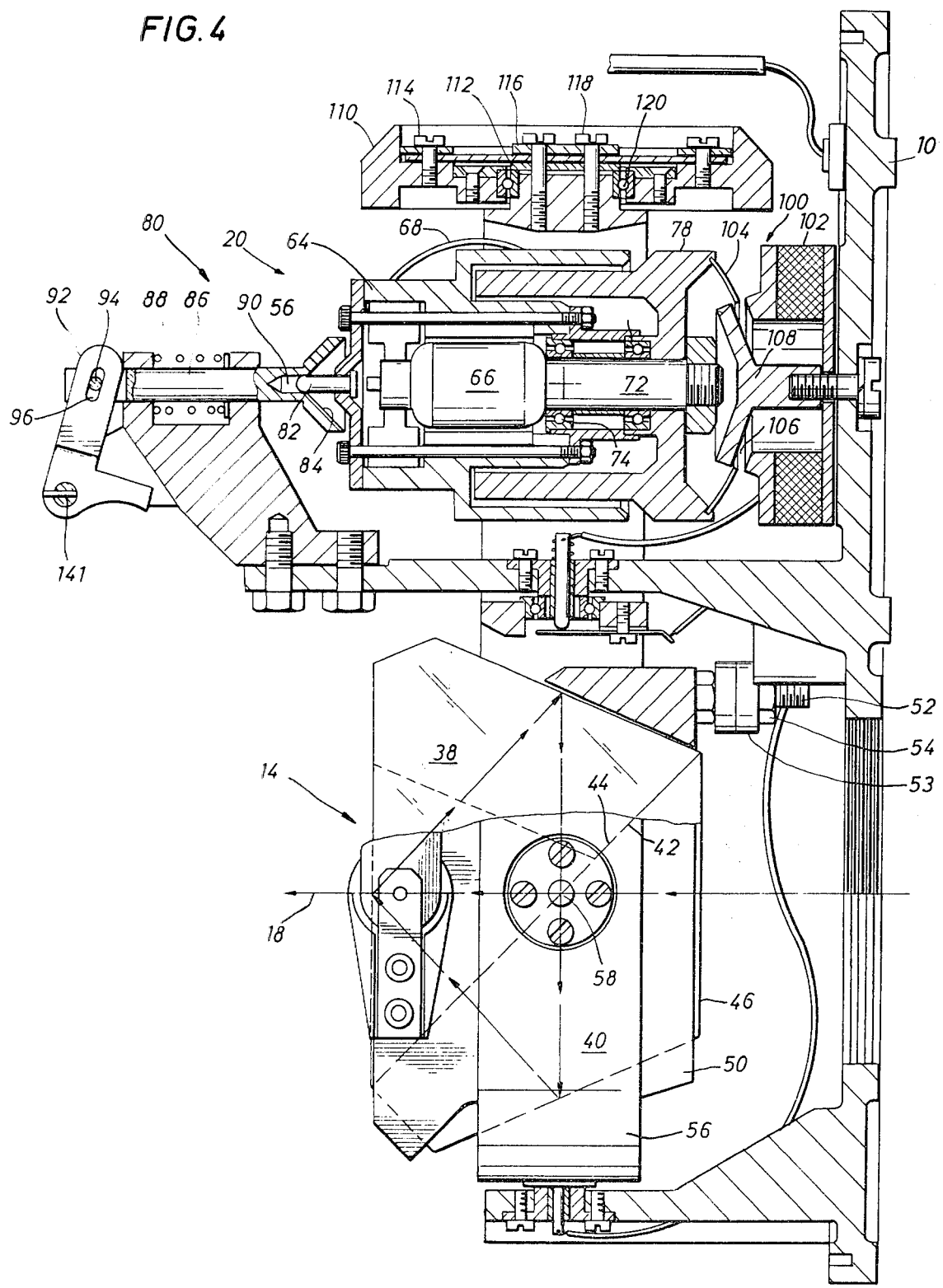
FIG. 4 is an enlarged plan view in cross section showing the stabilized optical element and gyroscopic stabilizer of the optical system illustrated in FIG. 1.

Now referring to FIG. 4 as well as FIG. 1, a detailed plan view in cross section showing the gyroscopic stabilizer 20 of FIG. 1 is illustrated. By rotating a mass at a relatively high rate of speed, the gyroscopic stabilizer generates an inertial resistance to rotational movement about any axis perpendicular to the spin axis of the gyroscope. This inertia tends to cause the gyroscopic stabilizer 20 to maintain its initial orientation with regard to the earth when the housing 10 is rotated in azimuth or elevation. The gimbaled linkage between the stabilizer 20 and the prism 14, as discussed above, in turn couples the prism to the stabilizer and thereby acts to maintain the prism 14 in its initial orientation as well, consequently stabilizing the image which is viewed through the optical system.

Stabilization of the image formed by the objective group 12 occurs due to the pivot location for the prism 14. Conventional mathematical analysis for this optical system can be used to show that:

$$y_5 = -f_0 u_3 \qquad (1)$$

where:
$y_5$ is the objective lens image height after erection
$f_0$ is the focal length for the objective lens group; and
$u_3$ is the slope of a chief ray as measured prior to image erection by the prism.

Furthermore, it may also be demonstrated that:

$$y_5' = -h_1 + t_5 u_5 \qquad (2)$$

where:
$y_5'$ is the image height after movement of the stable element,
$h_1$ is the distance from the optical axis to an outlying corner of the prism 14,
$t_5$ is the difference between focal lengths of the objective and eyepiece lens groups, and
$u_5$ is the slope of a chief ray after image erection.

Using these equations it may be shown that for an angular deflection of 5 degrees ($\theta_c$) and with an objective focal length of 144 mm and an eyepiece focal length of 18 mm:

$y_5 = 12.586$ mm $y_5' = 1.581$ mm

For stabilization of the viewed image, no apparent angular motion can be visible, so that the exit angle of the chief ray, $\theta_c'$, must occur in the eyepiece exit pupil. Therefore:

$$\tan^{-1} \theta_c' = y_5'/f_e \qquad (3)$$

from which it can be seen that:

$\theta_c' = 5° = \theta_c$

As may be seen in FIG. 4, a motor housing 64 is connected to elevation gimbal 56. Mounted within the motor housing 64 is the gyroscope motor armature 66, which is electrically powered through lead 68 from a battery 70 (shown in FIG. 1). The motor armature 66 rotates a shaft 72, which is mounted within the motor housing 64 by means of the bearings 74 and 76. Attached to the shaft 72 is gyro flywheel 78, which is thereby rotated along with the shaft 72 by the motor armature 66.

Because of the perturbation forces acting upon it, the stabilizer 20 will tend to drift away from its initial orientation parallel to the optical axis over a period of time and with movement of the housing 10. Therefore, it is necessary to provide some means of orienting the stabilizer 20 and the attached prism 14 parallel to the optical axis 18 just prior to using the stabilized optical system, after the viewer has oriented the optical axis approximately toward the desired area to be viewed. To accomplish this, a caging mechanism 80 is provided. The caging mechanism includes a pin 82, which is affixed to the motor housing 64, and a conical member 84, which is slidably mounted in a bracket attached to the housing 10. The conical member 84 is formed at the end of a piston 86, which is biased toward the motor housing 64 by a spring 88. Thus, in the normal unactuated position of the caging mechanism, the conical member 84 engages the pin 82 in a cylindrical opening 90 as shown in FIG. 4, thereby overriding the gimballing arrangement and aligning the spin axis of the gyroscopic stabilizer 20 with the optical axis 18. A slotted rocker arm 92, which is pivoted about an attachment pin 141, is connected to the piston 86 through the slot 96 and a drive pin 94. The rocker arm 92 may be pivoted by pressing the momentary push button 98 shown in FIG. 1. When the desired image has been sighted the button 98 is depressed, and rocker arm 92 is thereby rotated about attachment pin 141, withdrawing piston 86 and the attached conical member 84 from pin 82, removing the constraints on the motion of gyroscopic stabilizer 20 and permitting it to control the orientation of prism 14.

As is well known to those skilled in the art, when a force is applied to a gyroscope in a direction perpendicular to the spin axis of the gyroscope, a reacting torque will tend to rotate the gyroscope about an axis parallel to the applied force. In order to avoid a consequent drift of the stabilizer 20, this effect, known as precession, must be compensated for. Consequently, a precession compensator 100 is provided for the gyroscopic stabilizer 20. Precession compensator 100 includes a magnet 102 and an aluminum disc 104. The magnet 102, which may be either a permanent magnet or an electromagnet, is specially shaped with a circumferential slot 106, which creates a gap in the core structure 108 of the magnet. The aluminum disc 104 is affixed to and rotates with the gyro flywheel 78. Consequently, when the gyroscopic stabilizer tilts in either azimuth or elevation away from an orientation parallel to the optical axis 18, the aluminum disc 104 will move into a portion of the circumferential slot 106 in the magnet 102. Consequently, the aluminum disc 104 will cut across some of the magnetic lines of force passing through the core structure 108. This cutting of the magnetic field causes eddy current to be formed in the aluminum disc 104. The eddy currents in turn generate a proportionate drag force normal to the precessional force, when tends to return the gyroscopic stabilizer 20 to the centered position.

In addition to axial precession, a gyroscope is also known to exhibit a more complicated wobbling motion of the spin axis, circular in nature, called nutation. Axial nutation will occur when exterior forces act to upset the inertially stable spinning of the gyroscope. Some means of absorbing this nutational energy must be provided when the gyroscope is used in a stablized optical system. The means should be highly responsive to nature to dampen the wobbling of the viewed image in the shortest possible time. Some prior art gyroscopically stabilized optical systems have included for this purpose a lossy coupling with damping between the gyroscopic component and the stabilized optical element. Such resilient couplings help to minimize nutational disturbances, but tend to cause delayed following or misalignment of the stabilized optical element because of the lack of rigidity between the stabilized optical element and the gyroscope. As a consequence, when an optical system so equipped is used for scanning or other viewing involving similar motions, it has been found that the stabilized optical element will tend to "swim" or move off of the viewing axis. This disadvantage is avoided in the present invention by the provision for a rigid gimballed linkage connecting the gyroscopic stabilizer 20 and the prism 14, as described above. Nutational damping in the present design is provided instead by a damper flywheel 110, which is resiliently affixed to the elevational gimbal 56 about the horizontal pivot axis of the gimbal. The flywheel 110 is attached to an energy absorbing element 112 by bolts 114. The energy absorbing element 112, in the preferred embodiment, is constructed of a vinyl polymer having a large damping coefficient. The element 112 is attached in turn by a washer 116 and bolts 118 to the elevation gimbal 56. The bearings 120 permit the damper flywheel 110 to rotate relative to the elevation gimbal 56 without allowing a change in the center of gravity of the unit.

After the light received by the optical system passes through the objective lens group 12 and through the stabilized prism 14, it is enlarged and collimated by the eyepiece lens group 16. The lens group 16 is contained within an adjustable lens barrel 122, in order to provide for adjustment of the eyepiece lens group along the optical axis 18, without rotation, thereby providing for focusing of the optical system on nearby objects and permitting adjustment for the eyes of different viewers. Focusing is implemented by rotating a focus nut 124 to which is affixed a cylindrical cam sleeve 126, establishing a helix of the required pitch receiving a pin 128. The drive pin 128 inturn is fixed in the lens barrel 122 and the lens barrel is prevented from rotating by means of a keyway as shown. The lens barrel 122 can therefore move only in an axial direction through the urging of pin 128, which is in turn moved axially by the helix cam sleeve 126.

An eye shield 130 is designed to fit around the forehead of the viewer and provide for the optimal location of the viewer's eye near the eyepiece lens group 16. The optical characteristics of the eyepiece lens group can be best understood by reference to FIG. 6, which is an optical schematic illustrating the ray tracing for the eyepiece lens group 16. The negative lens 132 and the field lens 134 are located in a novel manner in this design to provide an eyepiece with distinct advantages over those in the prior art. The dotted location 136 represents the image plane which would be formed by the objective lens group 12 in the absence of lens 134.

Those skilled in the art would typically consider the use of a wide field eye lens group of the Erfle type to enlarge the image of the object space in the present invention. The degree of performance required in the preferred embodiment, however, necessitates an essentially flat field over 65 degrees of coverage. In addition, the eyepiece exit pupil is to be located further away from the surface of lens 138 than is usual. The use of a relatively strong negative doublet 132 as a means of initial image enlargement greatly reduces the corrective severity of the remaining eye lens elements. Furthermore, its use allows one to design an exceptionally high retrofocus ratio, which is a feature of the preferred embodiment.

The eyepiece lens group is constructed so that the distance between the eye of the viewer and the last face of the last lens in the eyepiece lens group 16 is greater than the focal length of the eyepiece. Because of this relationship, the viewer is able to wear eye glasses while using the monocular and a large eye shield can be utilized without the necessity for restricting the field of vision under these conditions.

The wide angle eyepiece lens group 16 is made up of four components which are aligned along the optical axis 18 and are spaced from each other. The first component, negative lens 132, includes a collecting meniscus lens and a negative lens, which may be cemented together. This component has a diverging effect, and is positioned, as mentioned above, in front of the real image formed by the objective lens group 12. Consequently, the real image is formed only after the light rays have passed through this diverging member. The second component is a field lens 134, which serves to collect marginal rays, thereby promoting high relative pupil illumination. The third component, a cemented doublet 140, serves to control residual lateral color and distortion. The final component, a meniscus lens 138, serves to collect marginal rays and create the exit pupil at the required location.

A typical wide field of view eyepiece in the prior art will provide for an eye relief of approximately 0.7 times the effective focal length of the eyepiece. With the design illustrated in FIG. 6, however, an eye piece of 18 millimeters is obtained with an effective focal length of 16.5 millimeters. Consequently, a wide field eyepiece is achieved which produces an eye relief greater than the effective focal length by a factor of 1.09.

Although a typical embodiment of the present invention has been illustrated and discussed herein, numerous modifications and alternative embodiments of the apparatus of this invention will be apparent to those skilled in the art in view of this description. Accordingly, this description is to be construed as illustrative only and is provided for the purpose of teaching those skilled in the art the manner of constructing the apparatus of the invention. It is to be understood that the form of the invention shown and described herein is to be considered as the presently preferred embodiment. Various changes may be made in the configurations, sizes, and arrangements of the parts of the invention, as will be recognized by those skilled in the art, without departing from the scope of the invention. For example, equivalent elements might be substituted for those illustrated and described herein, parts or connections might be reversed or otherwise interchanged, and certain features of the invention might be utilized independently of the use of other features, all as will be apparent to one skilled in the art after receiving the benefit obtained through reading the foregoing description of the invention.

What is claimed is:

1. A stabilized optical system comprising:

a housing;

an objective lens group mounted to said housing for collecting light from an object to be viewed;

an eyepiece lens group adjustably mounted to said housing for focusing an image at the eye of a viewer;

a stabilized optical element pivotally mounted to said housing between said objective and eyepiece lens group;

said stabilized optical element comprising a roof Pechan prism, said prism being pivoted in elevation about a horizontal axis passing through the midpoint between the nodal points of said eyepiece and objective lens groups, and pivoted in azimuth about a vertical axis passing through the midpoint between the nodal points of said eyepiece and objective lens groups, a gyroscopic stabilizer positioned off the optical axis of said lens groups; and a rigid linkage connecting said stabilized element and said stabilizer, thereby isolating said stabilized element from rotational motion of said housing;

said rigid linkage connecting said stabilized element and said gyroscopic stabilizer comprising an elevation gimbal pivotally attached to said housing about a horizontal axis passing through the midpoint between the nodal points of said eyepiece and objective lens group;

an optical element azimuth gimbal pivotally connecting said elevation gimbal to said optical element about a first vertical axis passing through said midpoint;

a stabilizer azimuth gimbal pivotally connecting said elevation gimbal to said gyroscopic stabilizer about a second vertical axis; and a link for orienting said optical element with said gyroscopic stabilizer in azimuth, said link being pivotally connected to said optical element about a third vertical axis and being pivotally connected to said gyroscopic stabilizer about a fourth vertical axis, said first, second, third, and fourth vertical axes being arranged such that the distance between said first and second vertical axes is equal to the distance between said third and fourth vertical axes, and such that the distance between said first and third vertical axis is equal to the distance between said second and fourth vertical axes.

2. The system of claim 1, further comprising a damper resiliently connected to said elevational gimbal about said horizontal axis for providing nutational damping.

3. The system of claim 2, wherein said resilient connection comprises an energy absorbing vinyl polymer having a high damping coefficient.

4. The system of claim 1, further comprising a precession compensator, including:

a magnet mounted to said housing and aligned with the spin axis of said gyroscopic stabilizer; and a nonmagnetic member affixed to said gyroscopic stabilizer and aligned with said spin axis, said member being adapted to cut the magnetic field of said magnet when said gyroscopic stabilizer pivots in azimuth or elevation, thereby creating an eddy current induced drag force to realign said gyroscopic stabilizer.

* * * * *

UNITED STATES PATENT AND TRADEMARK OFFICE
CERTIFICATE OF CORRECTION

PATENT NO. : 4,260,218
DATED : April 7, 1981
INVENTOR(S) : Spencer O. Gullicksen; Thomas A. Roberts It is certified that error appears in the above-identified patent and that said Letters Patent are hereby corrected as shown below:

Column 8, line 26, "to nature" should read --in nature--.

Column 9, line 60, "an eye piece" should read --an eye relief--.

Signed and Sealed this

Eleventh Day of August 1981

[SEAL]

Attest:

Attesting Officer

GERALD J. MOSSINGHOFF

Commissioner of Patents and Trademarks